June 17, 1941.  C. HUMMEL  2,246,252
DRYING APPARATUS
Filed Dec. 14, 1939
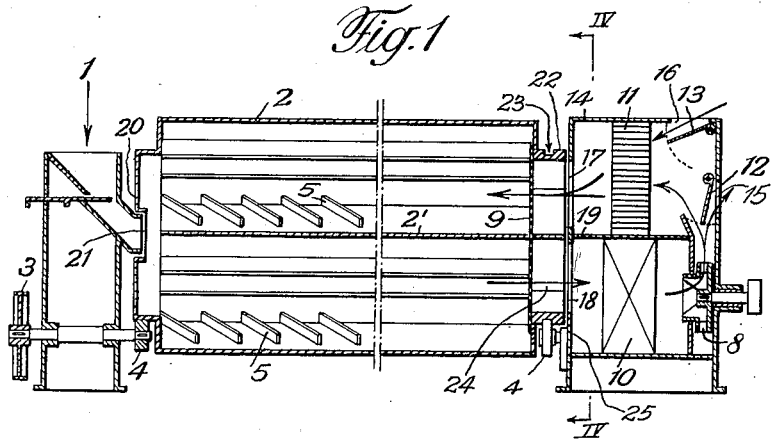
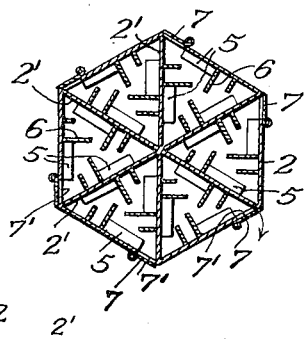
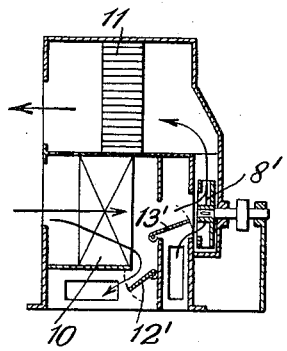
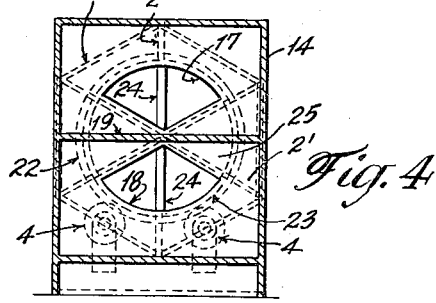
Inventor:
Charles Hummel
By Sommers & Young
Attys Patented June 17, 1941

2,246,252

UNITED STATES PATENT OFFICE 2,246,252

DRYING APPARATUS

Charles Hummel, Niederuzwil, Switzerland, assignor to Gebrüder Bühler, Uzwill, Switzerland Application December 14, 1939, Serial No. 309,283
In Germany February 1, 1939

6 Claims. (Cl. 34—109)

This invention relates to drying apparatus and more particularly to apparatus for drying paste goods, such as vermicelli, or the short crooked pieces sometimes called "elbows," and the like.

It is an object of the invention to provide a drying apparatus for paste goods comprising a drying drum which is subdivided into a plurality of axially extending compartments the walls of which are provided with pallets for evenly distributing the goods in the compartments, and for maintaining the uniform distribution thereof during rotation of the drum throughout the entire drying process, so that a relatively small torque is required for effecting the rotary motion of the drum.

It is a further object of the invention to provide means for subjecting the goods in all compartments to uniform drying conditions by passing a circulating stream of preheated air through the drum in such manner that each compartment is successively traversed in opposite directions by said stream of air.

A still further object of the invention is to enable the control of the temperature and the relative moisture content of the circulating air by the provision of adjustable shutters or flap valves for letting any desired proportion of the circulating air escape to the atmosphere and admitting a corresponding amount of fresh air into the apparatus.

Referring now to the accompanying drawing illustrating two forms of embodiment of the invention, Figure 1 shows a drying apparatus in longitudinal section, additional air for drying being admitted by suction between the blower and drying chambers;

Figure 2 is a transverse section through the drum;

Figure 3 is a fragmentary longitudinal section of an apparatus in which additional drying air is admitted in front of the blower between the drying chambers and the blower inlet; and Figure 4 is a section along the line IV—IV of Fig. 1.

The paste goods to be dried are fed to the apparatus through the entrance chute 1 into the revolving drum 2 comprising partition walls 2' which subdivide the interior of the drum into six sector-shaped axially extending compartments. The drum is suitably mounted on rollers 4 and driven by a pulley 3 connected to one of the rollers 4 engaging the drum by friction or by gearing. The internal sides of the outer walls of the drum 2 and the partitions 2' are provided with distributing pallets 5 which are destined to suitably guide and distribute the goods within the drum. The walls and partitions of the drum are further provided with baffles 6 serving to effect a constant purling motion of the goods. Shutters 7 are provided for closing openings 7' in each compartment of the drum, and are used for emptying the drum 2. The end wall 20 of the drum, in which the inlet opening 21 for the goods to be dried is provided, is spaced from the edges of the partitions 2' so as to form a communicating passage between the various compartments. On the side of the drum opposed to the entrance chute 1 there is disposed a casing 14 containing a blower 8 for creating the necessary circulating stream of air. The end face of the drum 2 adjacent the casing 14 is provided with a screen 9 through which air may penetrate, but which forms a closure for the compartments and prevents the escape of goods to be dried. The casing 14 of the blower contains a partition wall 19 below which an air filter 10 is disposed to collect impurities, dust and the like from the air leaving the drum. A preheater 11 above the partition 19, through which the air is forced prior to its entrance into the drum, may be operated by steam, electricity, gas, etc. An adjustable flap 12 is provided behind an opening 15 in the casing 14 for letting escape a certain amount of the air having passed through the drum, and a second adjustable flap 13 cooperating with the opening 16 in the casing serves to regulate the admission of fresh air into the circuit of drying air. The casing 14 forms a fixed air inlet opening 17 and a fixed air outlet opening 18 for the drum 2. Upon rotation of the drum, the screened end of each compartment successively passes in front of the inlet and the outlet opening.

In order to prevent short-circuiting between the exhaust and the inlet sides of the blower, the cylindrical extension 22 of the drum, having a track 23 for one of the rollers 4, is provided with a number of radial partition walls 25 equal to the number of partitions 2' of the drum and disposed in axial alignment with these partitions. The openings 17 and 18 in the wall 25 of the casing 24 are disposed above and below the partition 19 and are of sector shape of such a size that none of the sector-shaped compartments formed by the radial partitions 24 in the cylindrical extension 22 can simultaneously communicate with both openings 17 and 18.

The described drying apparatus operates as follows: The goods to be dried are fed through the chute 1 towards the central portion of the front face of the drum 2 and are evenly distributed into the various compartments. The pallets 5 provide a uniform distribution of the goods within any particular compartment. The blower 8 generates a stream of circulating air through the drum, and this air is heated by the preheater 11. The temperature and moisture content of the circulating air can be controlled according to the advance of the drying process by adjustment of the preheater and of the flaps 12 and 13, controlling the admission of fresh air and the exhaust of moist air.

Owing to rotation of the drum, the compartments successively pass through the top and the bottom position, so that a stream of air alternately directed from right to left and then from left to right passes through each compartment. Thus, the conditions of drying are always identical in the entire drum. The filter 10 collects the dust which is formed in the drying goods, and after completion of the drying process, quite uniformly dried and extremely clean paste goods will be delivered by this drying apparatus.

As shown in the apparatus according to Fig. 1, the blower 8 is disposed to draw air from the drum; in this case the air control flaps 12 and 13, when viewed in the direction of the air stream, are disposed after the blower.

In the modification shown in Fig. 3 the blower 8' is disposed to blow air into the drum. In this case, the flaps 12' and 13', when viewed in the direction of the air stream, are disposed ahead of the blower.

While the invention has been described in connection with the specific construction shown in the accompanying drawing, it is obvious that changes in the structure, form and arrangement of parts may be made without departing from the scope of the invention.

I claim:

1. An apparatus for drying paste goods, comprising a rotatable drum adapted to receive the goods to be dried, partition walls within said drum for subdividing the drum in a plurality of axially extending compartments communicating with each other at one of their ends, means for distributing the goods within said compartments, a screen for closing the other ends of said compartments, means for creating a circulating stream of air passing through the drum, and means adjacent the screened ends of said compartments providing fixed air inlet and outlet openings whereby upon rotation of said drum each compartment successively passes with the screened end thereof in front of said air inlet and outlet openings.

2. An apparatus for drying paste goods, comprising a rotatable drum adapted to receive the goods to be dried, partition walls within said drum for subdividing the drum in a plurality of axially extending compartments communicating with each other at one end of the drum, means for distributing the goods within said compartments, baffles within the compartments for imparting a purling motion to the goods to be dried, a screen disposed across the other end of the drum and forming a closure for said compartments, a casing disposed adjacent the screened end of the drum, means in said casing for creating a circulating stream of air passing through the drum, said casing providing fixed air inlet and outlet openings for said drum adjacent the screened end thereof whereby upon rotation of the drum each compartment successively passes in front of said air inlet and outlet openings and each compartment is successively traversed in opposed directions by said stream of air, and means in said casing for letting escape a portion of the circulating air and for admitting a corresponding portion of fresh air.

3. An apparatus for drying paste goods, comprising a drum adapted to contain the goods to be dried, means for mounting said drum for rotation, partition walls within said drum for subdividing the drum into a plurality of axially extending compartments communicating with each other at one end of the drum, means for feeding the goods to be dried into said compartments at said end of the drum, means for distributing the goods within the compartments, a screen disposed at the other end of the drum and forming a closure for said compartments, a casing disposed adjacent to the screened end of the drum, a blower in said casing for creating a circulating stream of air traversing said screen and the drum, said casing providing fixed inlet and outlet openings for said drum adjacent the screened end thereof whereby upon rotation thereof each compartment successively passes in front of the air inlet and outlet openings and each compartment is successively traversed in opposed directions by said stream of air, means for preheating the stream of circulating air in said casing, an air filter arranged to be traversed by the circulating stream of air, and means in said casing for letting escape a portion of the circulated air and for admitting a corresponding portion of fresh air.

4. An apparatus for drying paste goods, comprising a drum adapted to contain the goods to be dried, means for rotatably mounting said drum, partition walls within said drum for subdividing the drum into a plurality of axially extending compartments communicating with each other at one end of the drum, means for feeding the goods to be dried into said compartments at said end of the drum, means for distributing the goods within the compartments, a screen disposed at the other end of the drum and forming a closure for said compartments, a casing disposed adjacent to the screened end of the drum, a blower in said casing for creating a circulating stream of air traversing said screen and the drum, said casing providing fixed inlet and outlet openings for said drum adjacent the screened end thereof whereby upon rotation thereof each compartment successively passes in front of the air inlet and outlet openings and each compartment is successively traversed in opposed directions by said stream of air, means for preheating the stream of circulating air in said casing, and means in said casing for letting escape a portion of the circulated air and for admitting a corresponding portion of fresh air.

5. A drying apparatus comprising a rotatable drum adapted to receive the goods to be dried, partition walls within said drum for subdividing the drum in a plurality of axially extending drying compartments communicating with each other at one end of the drum, means for creating a circulating stream of air passing through the drum, a stationary member disposed at the other end of the drum and provided with inlet and outlet openings for said circulating stream of air, and means for rotating the drum, whereby said compartments successively communicate with said stationary inlet and outlet openings and each compartment is successively traversed in opposite directions by said stream of air.

6. A drying apparatus comprising a rotatable drum adapted to receive the goods to be dried, radial partition walls within said drum for subdividing the drum in a plurality of axially extending drying compartments communicating with each other at one end of the drum, a blower casing disposed at the other end of the drum and including a stationary wall adjacent the end of the drum, said wall being provided with inlet and outlet openings for a circulating stream of drying air passing through the drum, and means for rotating said drum whereby said compartments successively communicate with said stationary inlet and outlet openings and each compartment is successively traversed in opposite directions by said stream of air.

CHARLES HUMMEL.